(12) United States Patent
Tsujimoto et al.

(10) Patent No.: US 11,599,183 B2
(45) Date of Patent: Mar. 7, 2023

(54) ELECTRONIC DEVICE, METHOD, AND STORAGE MEDIUM

(71) Applicant: CANON KABUSHIKI KAISHA, Tokyo (JP)

(72) Inventors: Yuki Tsujimoto, Tokyo (JP); Hiroki Kitanosako, Tokyo (JP); Masashi Yoshida, Miura-gun (JP); Kazuya Miyahara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/940,915

(22) Filed: Jul. 28, 2020

(65) Prior Publication Data
US 2021/0034139 A1 Feb. 4, 2021

(30) Foreign Application Priority Data
Jul. 31, 2019 (JP) .............................. JP2019-141730

(51) Int. Cl.
*G06F 1/3287* (2019.01)
*G06F 1/26* (2006.01)
*G06F 1/3212* (2019.01)
*G06F 13/40* (2006.01)
*G06F 13/42* (2006.01)
*H02J 7/00* (2006.01)

(52) U.S. Cl.
CPC ............ *G06F 1/3287* (2013.01); *G06F 1/266* (2013.01); *G06F 1/3212* (2013.01); *G06F 13/4022* (2013.01); *G06F 13/4282* (2013.01); *H02J 7/0042* (2013.01); *G06F 2213/0042* (2013.01)

(58) Field of Classification Search
CPC ......... Y02D 10/00; Y02D 30/50; H02J 50/80; H02J 7/00034; H04L 47/748; G06F 21/34; G06F 1/3203; G06F 1/3287; G06F 1/266; G06F 1/26
USPC .................. 370/311; 713/300, 320, 324, 323
See application file for complete search history.

(56) References Cited

U.S. PATENT DOCUMENTS

2006/0117195 A1* 6/2006 Niwa ...................... G06F 1/325
                                                                713/300
2009/0273764 A1    11/2009 D'Alessio
2011/0043162 A1*  2/2011 Lee ..................... H02J 7/00712
                                                                320/107

(Continued)

FOREIGN PATENT DOCUMENTS

| CN | 107577620 A | 1/2018 |
| CN | 108539808 A | 9/2018 |
| JP | 2012-215993 A | 11/2012 |

OTHER PUBLICATIONS

"Universal Serial Bus Specification REVISION 2.0", vol. REVISION 2.0, Apr. 27, 2000, pp. 1-650.

*Primary Examiner* — Faisal M Zaman
(74) *Attorney, Agent, or Firm* — Canon U.S.A., Inc. IP Division

(57) ABSTRACT

An electronic device includes a connection unit that receive power from a power supply apparatus via a first terminal, a communication control unit that communicates with the power supply apparatus via a second terminal to receive power supply capability information of the power supply apparatus, and a control unit that disables activation of the electronic device before the communication control unit receives a predetermined notification from the power supply apparatus.

18 Claims, 9 Drawing Sheets

(56) References Cited

U.S. PATENT DOCUMENTS

| | | | |
|---|---|---|---|
| 2013/0063098 A1* | 3/2013 | Knowlton | H02J 7/00 |
| | | | 320/137 |
| 2013/0086284 A1* | 4/2013 | Shaver | G06F 1/3287 |
| | | | 710/18 |
| 2013/0166928 A1* | 6/2013 | Yang | G06F 1/3212 |
| | | | 713/300 |
| 2013/0198535 A1 | 8/2013 | Takashima | |
| 2015/0193357 A1* | 7/2015 | Venas | G06F 1/10 |
| | | | 710/8 |
| 2017/0017295 A1* | 1/2017 | McPherson | G06F 11/3414 |
| 2017/0140887 A1 | 5/2017 | Waters | |
| 2017/0142309 A1* | 5/2017 | Hayashi | H04N 5/23203 |
| 2018/0004277 A1 | 1/2018 | Matsui | |
| 2018/0102645 A1 | 4/2018 | Chong | |
| 2018/0181177 A1 | 6/2018 | Fukute | |
| 2018/0189223 A1 | 7/2018 | Nge | |
| 2019/0012479 A1* | 1/2019 | Diaz Carmena | G06F 21/31 |
| 2019/0148968 A1 | 5/2019 | Kim et al. | |
| 2020/0073455 A1* | 3/2020 | Na | G06F 13/4282 |
| 2020/0272218 A1* | 8/2020 | Rowley | G06F 1/3206 |
| 2021/0034139 A1* | 2/2021 | Tsujimoto | G06F 1/26 |

* cited by examiner

POWER SUPPLY MAY BE DECREASED
OWING TO SUPPLIER'S CIRCUMSTANCES,
AND DEVICE CAN BE SHUT DOWN

OK

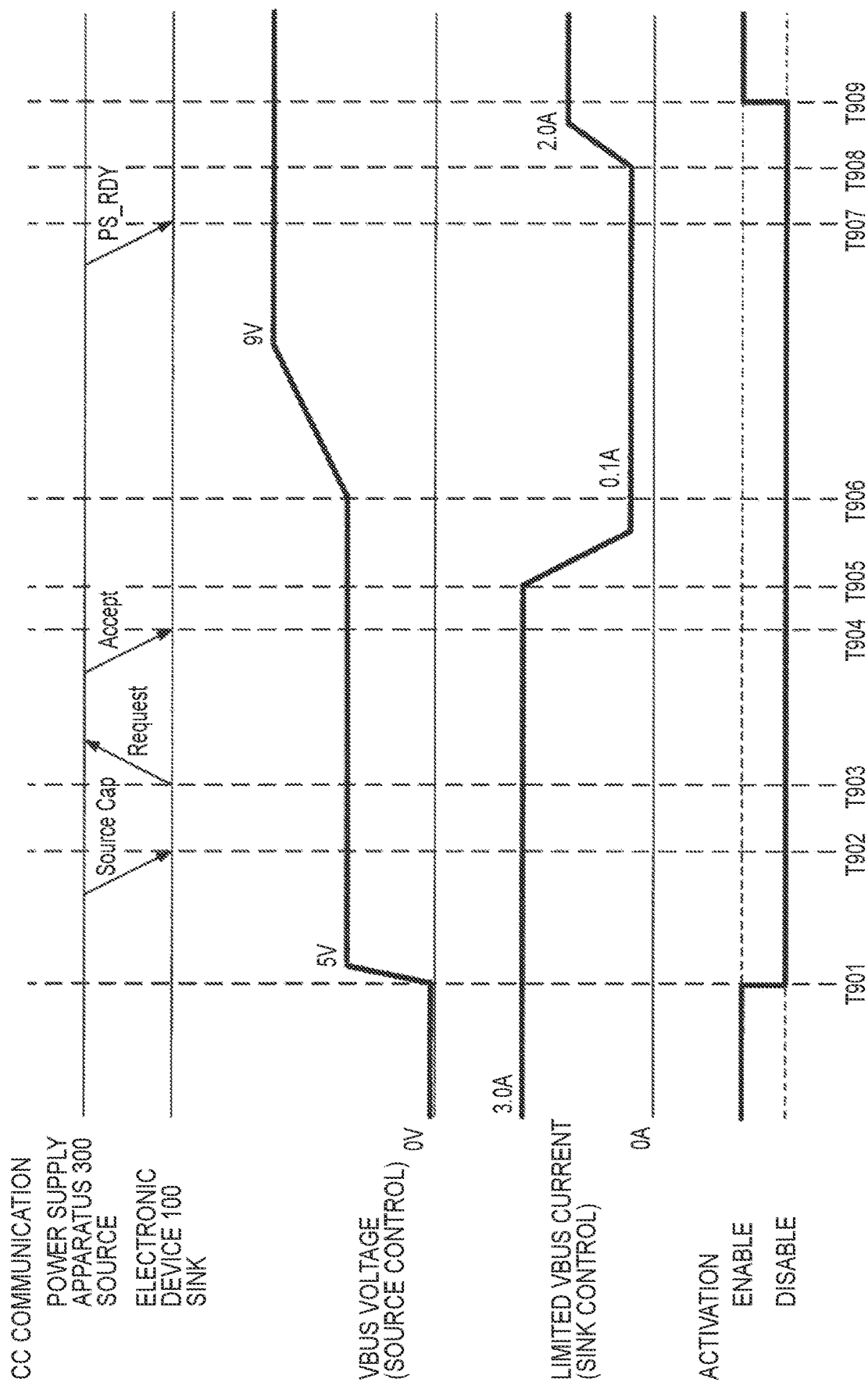

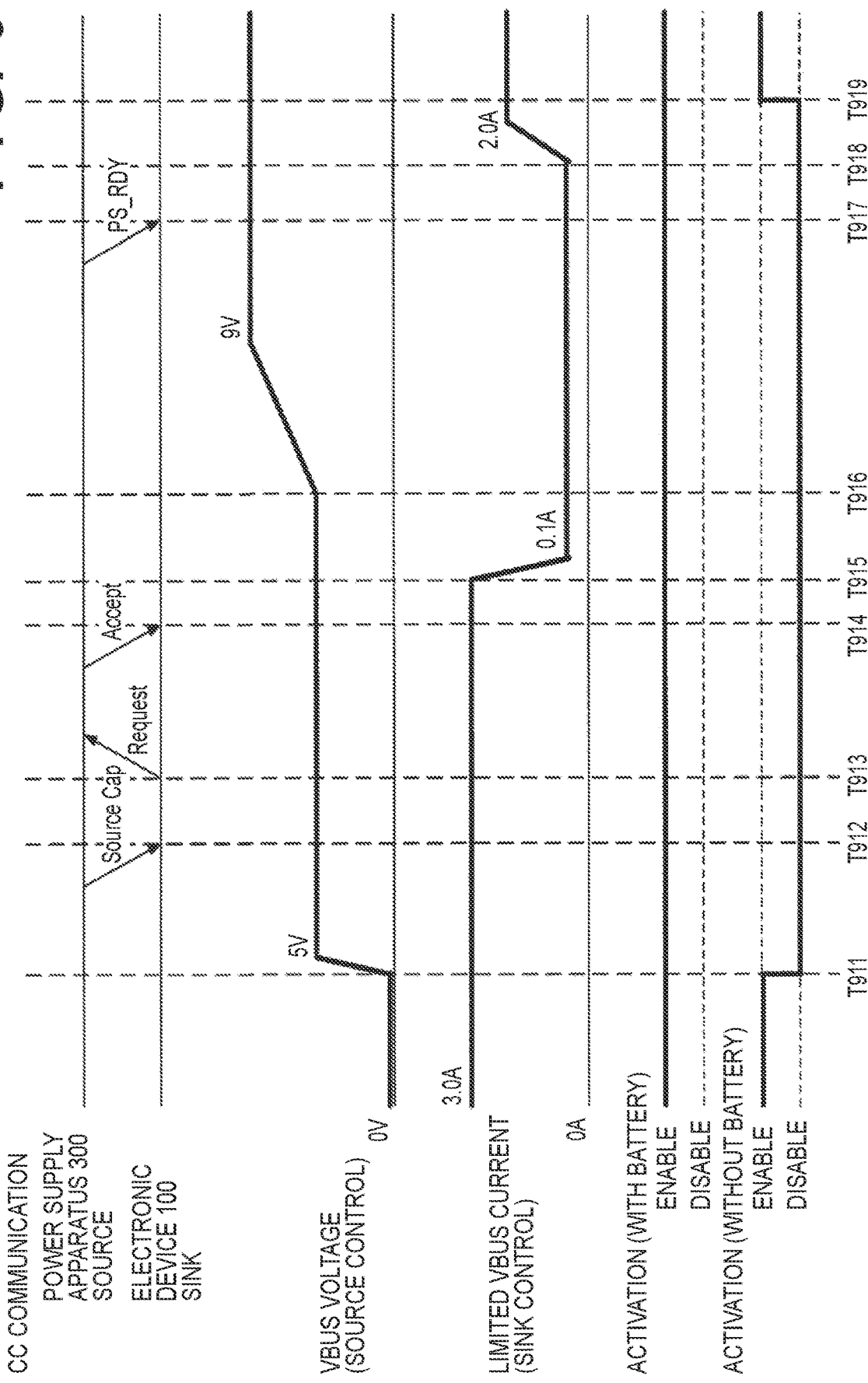

ELECTRONIC DEVICE, METHOD, AND STORAGE MEDIUM

BACKGROUND

Field

Aspects of the disclosure generally relate to electronic devices that are driven by power from a power supply apparatus, a method, and a storage medium.

Description of the Related Art

Japanese Patent Laid-Open No. 2012-215993 discloses an electronic device that receives power from an external device via a Universal Serial Bus (USB).

Japanese Patent Laid-Open No. 2012-215993 does not describe USB Type-C standard and USB Power Delivery (PD) standard, which are new standards at the time of this application. Devices based on the USB PD standard can use currents or voltages higher than the currents or voltages specified in the USB Type-C standard.

When an electronic device conforming to USB standards (the USB Type-C standard and the USB PD standard) is connected to a power supply apparatus, the electronic device performs a power supply capability detection process of the USB Type-C standard and a voltage and current determination process of the USB PD standard. The voltage and current determination process of the USB PD standard is performed after the power supply capability detection process of the USB Type-C standard is performed. The voltage and current determination process of the USB PD standard is under the constraint that, if the voltage supplied from the power supply apparatus is not 5 V, the power to be received from the power supply apparatus has to be brought to a predetermined power (2.5 W) or less within a predetermined time (15 ms) after receiving voltage-and-current determination.

If the electronic device is activated immediately after the power supply capability detection process of the USB Type-C standard ends, the power received from the power supply apparatus in the voltage and current determination process of the USB PD standard, which is performed after the electronic device is activated, may not be limited to 2.5 W or less. If the power received from the power supply apparatus cannot be limited to 2.5 W or less, the electronic device can fall short of power supply before power supply conforming to the USB PD standard is performed, possibly causing instantaneous interruption of power supply to the electronic device.

SUMMARY

According to an aspect of the embodiments, shortage of power supply to the electronic device before power supply based on the USB PD standard is performed is prevented.

According to an aspect of the embodiments, there is provided an electronic device that includes a connection unit that receives power from a power supply apparatus via a first terminal; a communication control unit that communicates with the power supply apparatus via a second terminal to receive power supply capability information of the power supply apparatus; and a control unit that disables activation of the electronic device before the communication control unit receives a predetermined notification from the power supply apparatus.

According to an aspect of the embodiments, there is provided a method that includes receiving power from a power supply apparatus via a first terminal; communicating with the power supply apparatus via a second terminal to receive power supply capability information of the power supply apparatus; and disabling activation of an electronic device before a predetermined notification is received from the power supply apparatus.

According to an aspect of the embodiments, there is provided a non-transitory storage medium that stores a program causing a computer to execute a method, and the method includes receiving power from a power supply apparatus via a first terminal; communicating with the power supply apparatus via a second terminal to receive power supply capability information of the power supply apparatus; and disabling activation of an electronic device before a predetermined notification is received from the power supply apparatus.

Further aspects of the embodiments will become apparent from the following embodiments.

BRIEF DESCRIPTION OF THE DRAWINGS

FIG. 8 is a timing chart illustrating processing performed by the electronic device 100 in the first embodiment.

FIG. 9 is a timing chart illustrating processing performed by the electronic device 100 in the second embodiment.

DESCRIPTION OF THE EMBODIMENTS

Exemplary embodiments, features, and aspects of the disclosure will be described below with reference to the drawings. Aspects of the disclosure are not limited to the following embodiments. Each of the embodiments described below can be implemented solely or as a combination of a plurality of the embodiments. Also, features from different embodiments can be combined where necessary or where the combination of elements or features from individual embodiments in a single embodiment is beneficial.

First Embodiment

Figure 1:
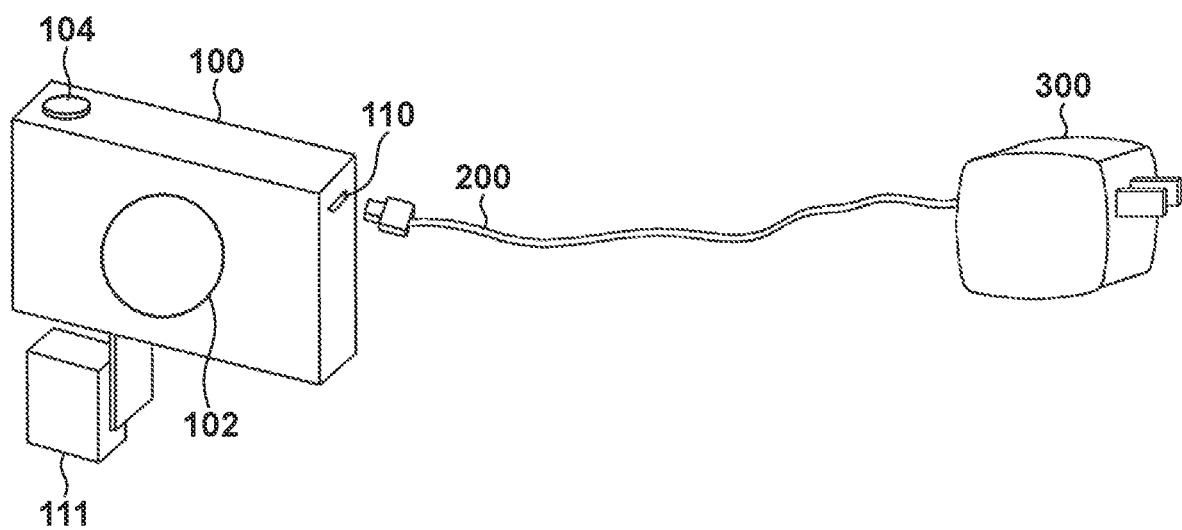
FIG. 1 is a diagram illustrating components of a power supply system of a first and second embodiment.

FIG. 1 is a diagram illustrating components of a power supply system of a first and second embodiment.

The power supply system includes an electronic device 100, a USB Type-C cable 200, and a power supply apparatus 300, as illustrated in FIG. 1. The electronic device 100, the USB Type-C cable 200, and the power supply apparatus 300 conform to the Universal Serial Bus (USB) standard, the USB Type-C standard, and the USB Power Delivery (PD) standard.

The electronic device 100 is an electronic device that can be, for example, a digital camera, a smartphone, a media player, a smart device, or a personal computer. The electronic device 100 includes an image capture unit 102, an operation unit 104, and a connection unit 110, which are described below. The electronic device 100 can be powered by power from a detachable battery 111. The connection unit 110 is a USB Type-C connector and can receive power from the power supply apparatus 300 through the USB Type-C cable 200.

The power supply apparatus 300 is a power supply apparatus that can be, for example, an alternating-current (AC) adapter or a mobile battery. The electronic device 100 can be powered by power supplied from the power supply apparatus 300 instead of power from the battery 111. The power supply apparatus 300 is a source device, and the electronic device 100 is a sink device in terms of the input/output relationship of the Vbus.

Figure 2:
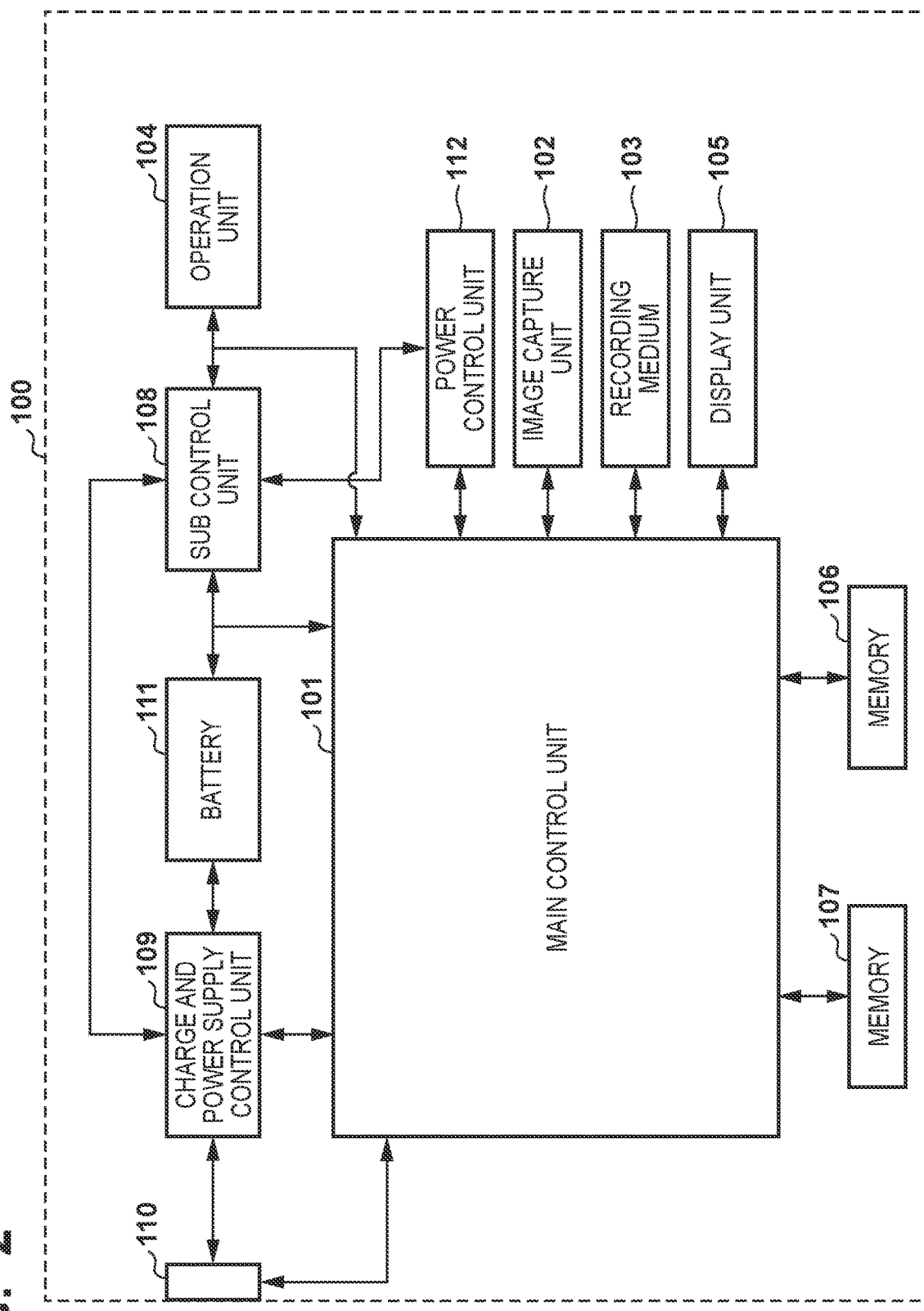
FIG. 2 is a block diagram illustrating a configuration of an electronic device 100 of the first and second embodiments.

Referring next to FIG. 2, components of the electronic device 100 will be described.

A main control unit 101 controls the components of the electronic device 100 based on a program. Instead of the main control unit 101 controlling the entire electronic device 100, different hardware components can share processes to control the entire electronic device 100.

The image capture unit 102 converts object light focused by a lens included in the image capture unit 102 to an electrical signal, performing a noise reducing process thereon, and outputting digital data as image data. The captured image data is stored in a buffer memory, is then subjected to a predetermined operation by the main control unit 101, and is recorded in a recording medium 103.

The recording medium 103 can record the image data output from the image capture unit 102. The recording medium 103 can be configured to be detachable/attachable with respect to the electronic device 100 or can be housed in the electronic device 100. For example, the electronic device 100 can include at least a unit for accessing the recording medium 103.

The operation unit 104 is used to receive an instruction to the electronic device 100 from the user and to send a signal to the main control unit 101 or the sub control unit 108. The operation unit 104 includes operation members, such as a power button for the user to turn on or off the power of the electronic device 100, a release switch for providing an image shooting instruction, and a zoom lever for providing a zooming instruction. The operation unit 104 also includes a play button for providing an image data playback instruction, a mode dial for providing an instruction to start the electronic device 100, and a touch panel provided on a display unit 105, described later. The release switch includes SW1 and SW2. When the release switch is brought into "a half-press state", SW1 is turned on. This enables the main control unit 101 to receive instructions to perform image shooting preparations such as an automatic focus (AF) process, an automatic exposure (AE) process, an automatic white balance (AWB) process, and an electronic flash preliminary emission (EF) process. When the release switch is brought into "a full press state", the SW2 is turned on. This enables the main control unit 101 to receive the instructions for image shooting.

The display unit 105 displays, for example, a view finder image during image capturing, captured image data, and text for a dialogical operation. The display unit 105 may not be necessarily housed in the electronic device 100. The electronic device 100 can be at least connected to the internal or external display unit 105 and can include at least a display control function for controlling the display of the display unit 105.

A memory 106 is used as a buffer memory or the like for temporarily storing the image data captured by the image capture unit 102. A memory 107 is a non-volatile memory in which, for example, programs executed by the main control unit 101, are stored.

A sub control unit 108 includes a processor that controls part of the electronic device 100, a random access memory (RAM) used as a work area, and a read only memory (ROM) storing processing procedures. The sub control unit 108 can operate with lower power consumption than the main control unit 101. The sub control unit 108 operates as a power control unit configured to control a charge and power supply control unit 109, described below, and to perform data communication with the main control unit 101.

The charge and power supply control unit 109 supplies power received from the connection unit 110 to the components. At the same time, the charge and power supply control unit 109 charges the battery 111 with the power received from the connection unit 110.

The connection unit 110 is an interface for connecting with the power supply apparatus 300. The electronic device 100 can exchange data with the power supply apparatus 300 via the connection unit 110. The electronic device 100 can also receive power from the power supply apparatus 300 via the connection unit 110. In the first and second embodiments, it is assumed that the electronic device 100 operates as a USB device equipment, and the connection unit 110 includes an interface connector for communicating with the power supply apparatus 300 via a USB, as well as a USB-device controller. The main control unit 101 implements USB communication and USB charging with the power supply apparatus 300 by controlling the connection unit 110.

The battery 111 is used to supply power necessary for operating the electronic device 100. The battery 111 is configured to be detachable/attachable with respect to the electronic device 100 and is configured to receive power via the connection unit 110 and the charge and power supply control unit 109 to be charged. The battery 111 includes a central processing unit (CPU) for an authentication process, a RAM, and a ROM and implements authentication with the main control unit 101 or the sub control unit 108 of the electronic device 100.

A power control unit 112 controls supply and interrupt of power from the battery 111 or the charge and power supply control unit 109 to the components according to the state of the electronic device 100. The power control unit 112 is controlled by the main control unit 101 or the sub control unit 108.

Figure 3:
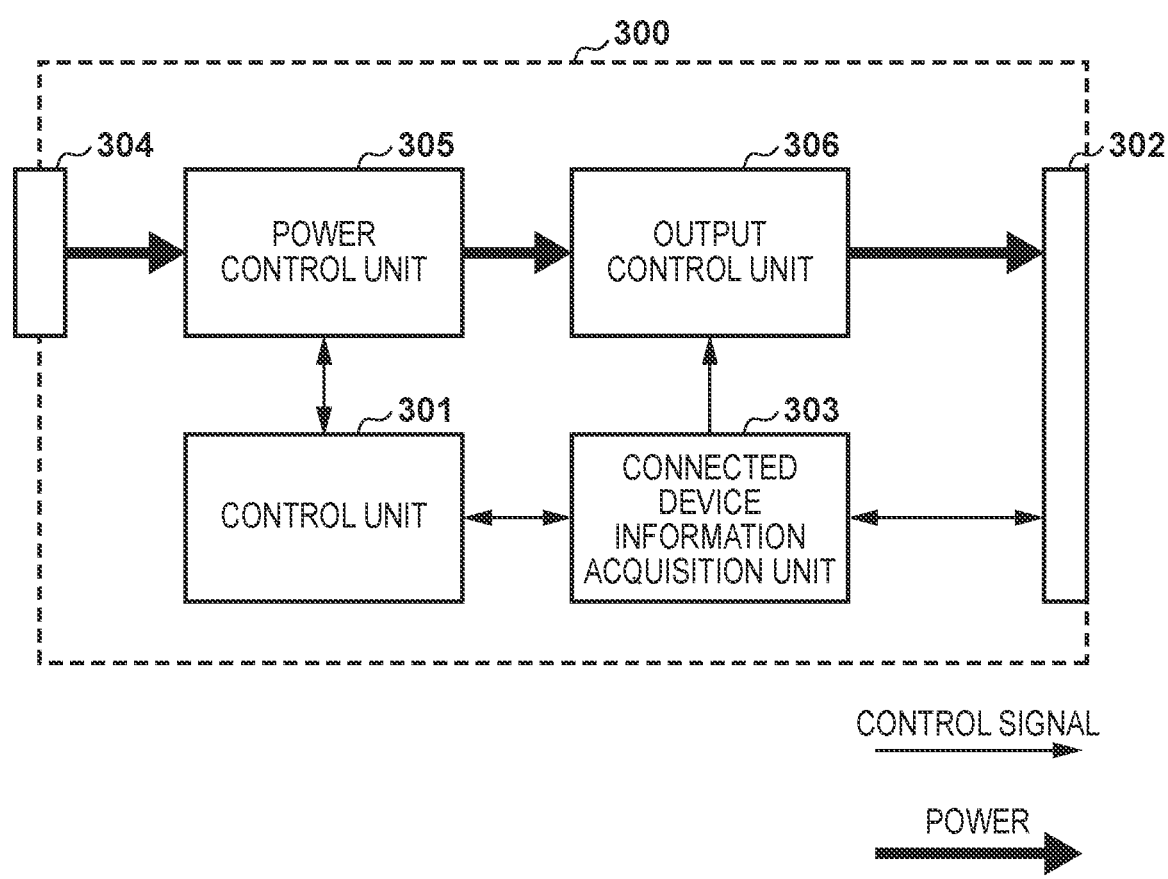
FIG. 3 is a block diagram illustrating a configuration of a power supply apparatus 300 of the first and second embodiments.

Referring next to FIG. 3, components of the power supply apparatus 300 will be described.

A control unit 301 includes a processor for controlling the components of the power supply apparatus 300, as well as a memory. A connection unit 302 is an interface for connecting with the electronic device 100. The power supply apparatus 300 connects to a power supply destination, for example, the electronic device 100, to supply power to, the electronic device 100.

A connected device information acquisition unit 303 operates as a communication control unit for the power supply apparatus 300. The connected device information acquisition unit 303 can report the power supply capability of the power supply apparatus 300 connected at the voltage of a Configuration Channel (CC) terminal. The connected device information acquisition unit 303 can negotiate supply power with the connected electronic device 100 by communication using the CC terminal, in addition to reporting the power supply capability thereto. The communication using the CC terminal is a communication based on the USB PD standard.

A connection unit 304 is connected to an external power source, such as a commercial power source and a mobile battery. A power control unit 305 changes the power obtained via the connection unit 304 to power that can be supplied to the electronic device 100. For example, if the connecting device of the connection unit 304 supplies power (9 V/3 A) to the electronic device 100 from a home power source (a 100 V/50 Hz alternating-current source), the power control unit 305 converts the alternating current to a direct current, thereby enabling an output of 9 V. The output voltage is changed under an instruction from the control unit 301 with reference to the power supply capability obtained by the connected device information acquisition unit 303. For example, the voltage and current that can be output through the power control unit 305 is power information that can be supplied by the power supply apparatus 300.

An output control unit 306 connects to a VBUS terminal of the connection unit 302. The output control unit 306 controls the supply and interrupt of the power supplied from the power control unit 305 to the external electronic device 100 via the VBUS terminal. For example, the output control unit 306 controls the output timing based on the connected device information acquisition unit 303 and performs a stop process when receiving a stop command from the electronic device 100.

Figure 4:
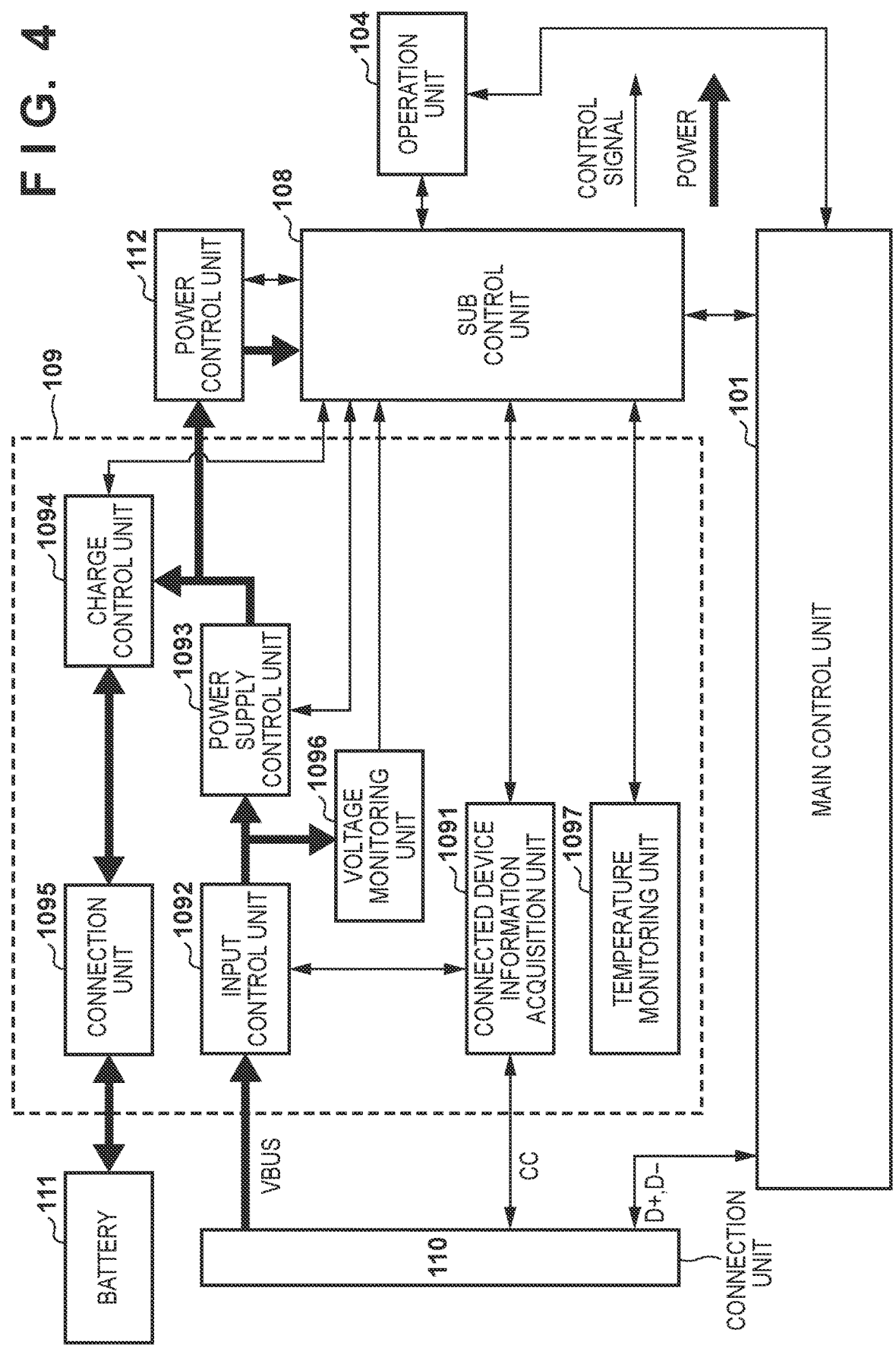
FIG. 4 is a block diagram illustrating components of a charge and power supply control unit 109 illustrated in FIG. 2.

Referring next to FIG. 4, the components of the charge and power supply control unit 109 of the electronic device 100 will be described.

A connected device information acquisition unit 1091 connects to the CC terminal of the connection unit 110 and operates as a communication control unit. The connected device information acquisition unit 1091 can detect the power supply capability of the connected power supply apparatus 300 at a CC terminal voltage. The connected device information acquisition unit 1091 can negotiate supply power with the connected power supply apparatus 300 by communication using the CC terminal.

An input control unit 1092 connects to a VBUS terminal of the connection unit 110. The input control unit 1092 can receive power from the power supply apparatus 300 connected to the VBUS terminal and switches the supply of the power to a power supply control unit 1093 based on the result obtained by the connected device information acquisition unit 1091.

The power supply control unit 1093 performs control for converting VBUS power supplied via the input control unit 1092 to a voltage that the power control unit 112 and a charge control unit 1094 can receive. The power supply control unit 1093 decreases the voltage of 5 V or 9 V to an appropriate voltage. For example, if the battery 111 is composed of one cell, the battery 111 is fully charged to 4.2 V. If the battery 111 is not present, the power supply control unit 1093 controls the VBUS power supplied via the input control unit 1092 to a voltage that is most efficient for the power control unit 112 (for example, 3.7 V).

The power supply control unit 1093 can also limit the supply current based on an instruction from the sub control unit 108 based on the power supply capability of the power supply apparatus 300 obtained by the connected device information acquisition unit 1091. For example, if the power supply capability of the power supply apparatus 300 is 9 V/3 A, the power supply control unit 1093 decreases the voltage to a predetermined voltage toward the battery voltage 4.2 V to prevent a current of 3.0 A or more from flowing.

The charge control unit 1094 enables charging the battery 111 connected to a connection unit 1095 (described below) with power received through the VBUS terminal via the input control unit 1092 and the power supply control unit 1093. The charge control unit 1094 performs constant current (CC) charging and constant voltage (CV) charging by controlling the current or the voltage so that the battery 111 is not damaged.

The connection unit 1095 can connect to the detachable battery 111. The connection unit 1095 includes a positive terminal connected to the positive terminal of the battery 111, a negative terminal connected to the negative terminal of the battery 111, a terminal connected to an authentication circuit of the battery 111, and a terminal connected to a thermistor of the battery 111.

A voltage monitoring unit 1096 monitors the input VBUS voltage and notifies the sub control unit 108 of the obtained voltage. For example, if the power supply capability of the power supply apparatus 300 is 9 V/3 A, the voltage monitoring unit 1096 monitors whether the power supply apparatus 300 is outputting a higher voltage than expected (for example, 15 V). Alternatively, the voltage monitoring unit 1096 monitors whether the output voltage is significantly below 9 V due to the short-circuit of the electronic device 100 in an abnormal state. The sub control unit 108 stops the input control unit 1092 and issues an instruction to stop the output to the power supply apparatus 300 via the connected device information acquisition unit 1091 as necessary.

A temperature monitoring unit 1097 monitors the temperature in the vicinity of the connection unit 110 and notifies the sub control unit 108 of the temperature. If the temperature in the vicinity of the connection unit 110 is a predetermined temperature or higher, the sub control unit 108 stops the input control unit 1092 and provides an instruction to stop power supply to the power supply apparatus 300 via the connected device information acquisition unit 1091.

Figure 5:
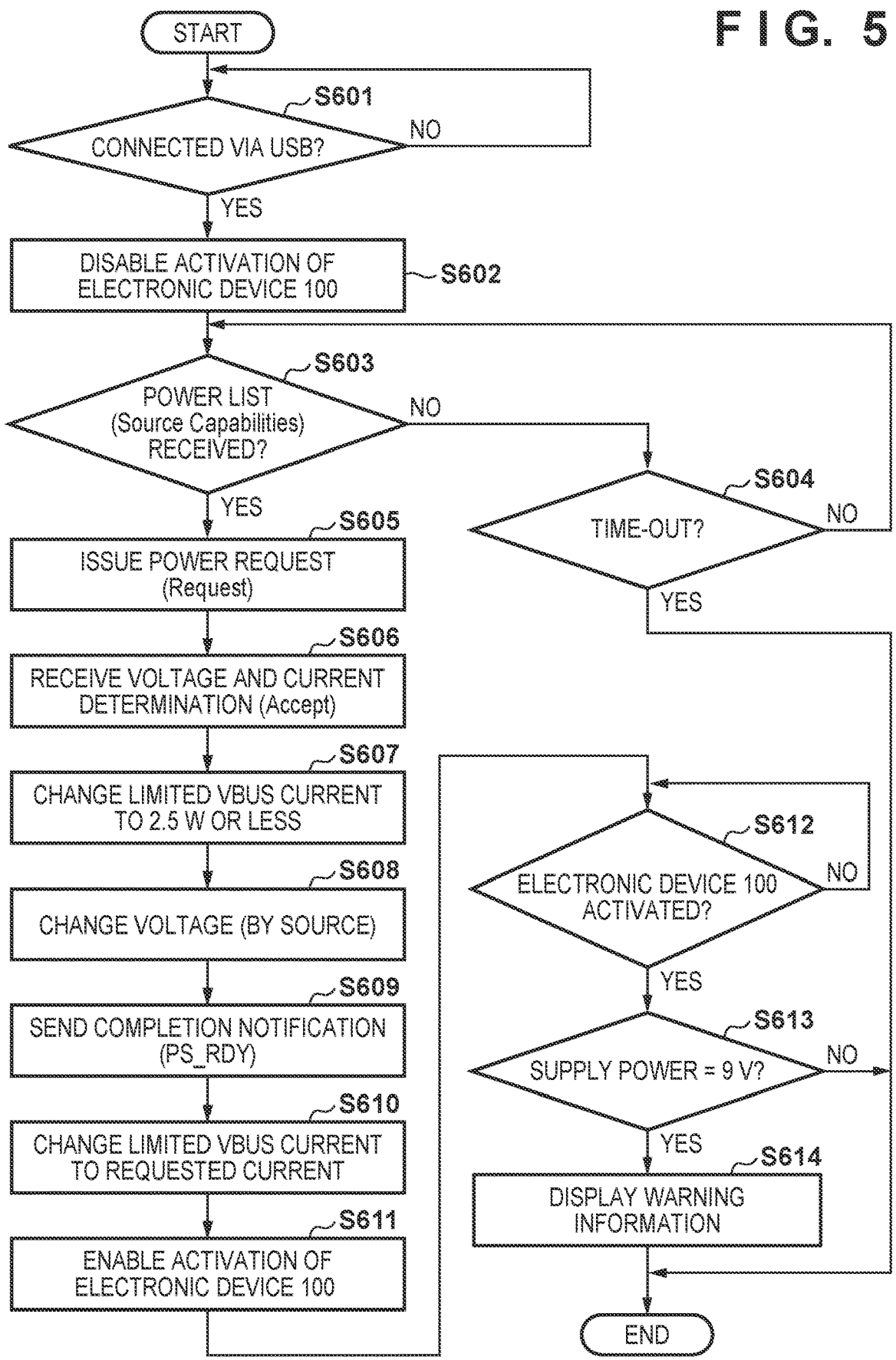
FIG. 5 is a flowchart illustrating processing performed by the electronic device 100 in the first embodiment.

Referring next to the flowchart of FIG. 5, processing when the electronic device 100 is connected to the power supply apparatus 300 through the USB Type-C cable 200 will be described. The processing illustrated in FIG. 5 is performed by the sub control unit 108 controlling the components of the electronic device 100 according to a program. The processing illustrated in FIG. 5 is started after the power supply apparatus 300 is connected to the connection unit 110 of the electronic device 100.

FIG. 8 is a timing chart for illustrating processing performed when the electronic device 100 that operates only with VBUS power (when the electronic device 100 to which the battery 111 is not connected is connected to the power supply apparatus 300 via through the USB Type-C cable 200).

FIG. 8 illustrates a communication signal from the connected device information acquisition unit 303 of the power supply apparatus 300 and a communication signal of the connected device information acquisition unit 1091 of the electronic device 100 from the top. The chart next illustrates the level of a VBUS voltage supplied from the power control unit 305 of the power supply apparatus 300 to the connection unit 110 through the USB Type-C cable 200. The chart next illustrates the value of a VBUS current (limited VBUS current) limited by the power supply control unit 1093. The chart also illustrates whether the sub control unit 108 permits activation of the electronic device 100 in response to an operation on the operation unit 104.

Referring next to FIGS. 5 and 8, the processing when the electronic device 100 is connected to the power supply apparatus 300 through the USB Type-C cable 200 will be described. In the first embodiment, the electronic device 100 is connected to the power supply apparatus 300 at a voltage of 5 V or 9 V. A voltage of 15 V or 20 V, or another voltage can also be used.

In step S601, the electronic device 100 detects that the power supply apparatus 300 is connected to the connection unit 110. The signals and so on proceed to state T901, in which a VBUS voltage of 5.0 V is supplied. Whether connection has been established can be determined by detecting the VBUS voltage with the voltage monitoring unit 1096 or by determining the voltage level of the CC terminal with the connected device information acquisition unit 1091. The processing does not proceed to the subsequent step until connection of the power supply apparatus 300 to the connection unit 110 is detected.

When the power supply apparatus 300 is connected to the connection unit 110, step S602 is started. In step S602, even if an activation button, which is one of the components of the operation unit 104, is pressed, the sub control unit 108 disables starting the main control unit 101 and the power control unit 112. As a result, the operation of the electronic device 100 is not started even if the user presses the activation button.

In step S603, the electronic device 100 waits for receipt of a power list (Source Capabilities) from the connected device information acquisition unit 303 to the connected device information acquisition unit 1091.

In step S604, the connected device information acquisition unit 1091 waits for receipt of the power list (Source Capabilities) until a time-out occurs. For example, if the electronic device 100 cannot receive the power list even after waiting for 620 ms, the electronic device 100 sends a reset signal to the connected device information acquisition unit 303 via the connected device information acquisition unit 1091. If the electronic device 100 cannot receive the power list even after repeating the above operation three times, a time-out occurs. Upon the time-out, the process for connection is terminated. The setting of the sub control unit 108 can be changed to permit the activation of the main control unit 101 and the power control unit 112 when an activation button, which is one of the components of the operation unit 104, is pressed.

If in step S603 the connected device information acquisition unit 1091 receives the power list (Source Capabilities), step S605 is started. T902 in FIG. 8 illustrates this state. Since, in the first embodiment, the power control unit 305 can supply a voltage of 5 V or 9 V, two lists of 5 V/3 A and 9 V/3 A are presented. Any of 5 V, 9 V, 15 V, and 20 V is presented in the list depending on the capacity of the power supply apparatus 300.

In the first embodiment, the activation of the camera is disabled when USB connection is detected. Alternatively, the activation of the camera can be disabled when the power list is received.

In step S605, the connected device information acquisition unit 1091 issues a power request (Request) to the connected device information acquisition unit 303. T903 in FIG. 8 illustrates this state. In the first embodiment, the electronic device 100 can be activated at 5 V/3 A or 9 V/2 A and issues a request for 9 V/2 A. The electronic device 100 can request any other voltage values that are present in the power list received in step S603.

The power supply apparatus 300 sends a voltage and current determination (Accept) to the electronic device 100 if it can supply the necessary power based on the power necessary for the electronic device 100 (Request), received by the connected device information acquisition unit 303.

In step S606, the connected device information acquisition unit 1091 receives the voltage and current determination (Accept) from the connected device information acquisition unit 303. T904 in FIG. 8 illustrates this state.

In step S607, the sub control unit 108 that has received the voltage and current determination (Accept) sets a VBUS current limit for the power supply control unit 1093 within a predetermined time (15 ms) after receiving the voltage and current determination (Accept). T905 in FIG. 8 illustrates this state. The limited VBUS current in the first embodiment, which is assumed to be changed to 9 V, needs to be set to approximately 0.277 A or less to satisfy predetermined power (2.5 W) or less in the case of 9 V. In the first embodiment, the limited VBUS current is set to 0.1 A or less. Thus, the current value that is limited depending on the required voltage is determined to be less than or equal to "predetermined power (2.5 W)÷required voltage". A limited VBUS current that is satisfied while the electronic device 100 is disabled may not necessarily be controlled by the power supply control unit 1093. This enables satisfying the restriction of the USB PD standard that, if the voltage supplied from the power supply apparatus 300 is not 5 V, the power to be received from the power supply apparatus 300 has to be brought to 2.5 W or less within 15 ms after receiving the voltage and current determination (Accept).

In step S608, the power supply apparatus 300 changes the output voltage VBUS from 5 V to 9 V by controlling the power control unit 305 based on an instruction from the control unit 301. T906 in FIG. 8 illustrates this state. After completion of the change to 9 V performed by the power control unit 305, the connected device information acquisition unit 303 sends a completion notification.

In step S609, the connected device information acquisition unit 1091 receives the completion notification (PS_RDY) from the connected device information acquisition unit 303. T907 in FIG. 8 illustrates this state.

In step S610, the sub control unit 108 requests the power supply control unit 1093 to change the limited VBUS current to the current value of the power request (Request). In the first embodiment, the sub control unit 108 sends a request to change the limited VBUS current from 0.1 A to 2.0 A requested in the case of 9 V. T908 in FIG. 8 illustrates this state.

In step S611, the sub control unit 108 that has received the completion notification (PS_RDY) changes the setting so as to enable activation of the main control unit 101 and the power control unit 112 when an activation button, which is one of the components of the operation unit 104, is pressed. This enables the user to start the operation of the electronic device 100 when the user presses the activation button. T909 in FIG. 8 illustrates this state.

Figure 7:
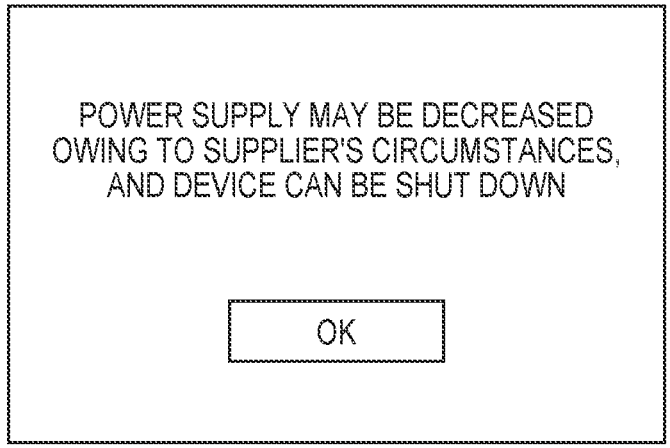
FIG. 7 is a diagram illustrating an example of warning information.

When the activation button, which is one of the components of the operation unit 104, is pressed so that the main control unit 101 and the power control unit 112 are activated (step S612), it is determined whether the supplied power is 9 V (step S613). Methods for the determination include detecting a VBUS voltage with the voltage monitoring unit 1096 and obtaining VBUS voltage information from the content of communication of the connected device information acquisition unit 1091 with the power supply apparatus 300. In this case, if the electronic device 100 is operating at 9 V, warning information, as illustrated in FIG. 7, is displayed on the display unit 105 (step S614). This is because, if the voltage has to be decreased to 5 V or the like due to some requirements on the power supply apparatus 300 side, the electronic device 100 can lose the power supply source to cause interruption of supply power in the electronic device 100. For example, warning information, "power supply can be decreased owing to supplier's circumstances, and the device can be shut down", as illustrated in FIG. 7, is displayed on the display unit 105.

In the first embodiment, the warning information is displayed on the display unit 105 only when the electronic device 100 is connected at 9 V, the warning information as illustrated in FIG. 7 can be displayed on the display unit 105 also when the electronic device 100 requests a voltage higher than 5 V and is connected at the voltage. While, in the first embodiment, the warning information as illustrated in FIG. 7 is displayed on the display unit 105, the warning information as illustrated in FIG. 7 can be output with a speaker or the like.

When the electronic device 100 is connected at 5 V, no voltage change occurs unless the power request (Request) is provided by the connected device information acquisition unit 1091 even if the power list is updated to a voltage higher than 5 V, producing no problem. For that reason, if the connection in step S613 is at 5 V, the processing ends.

Second Embodiment

Figure 6:
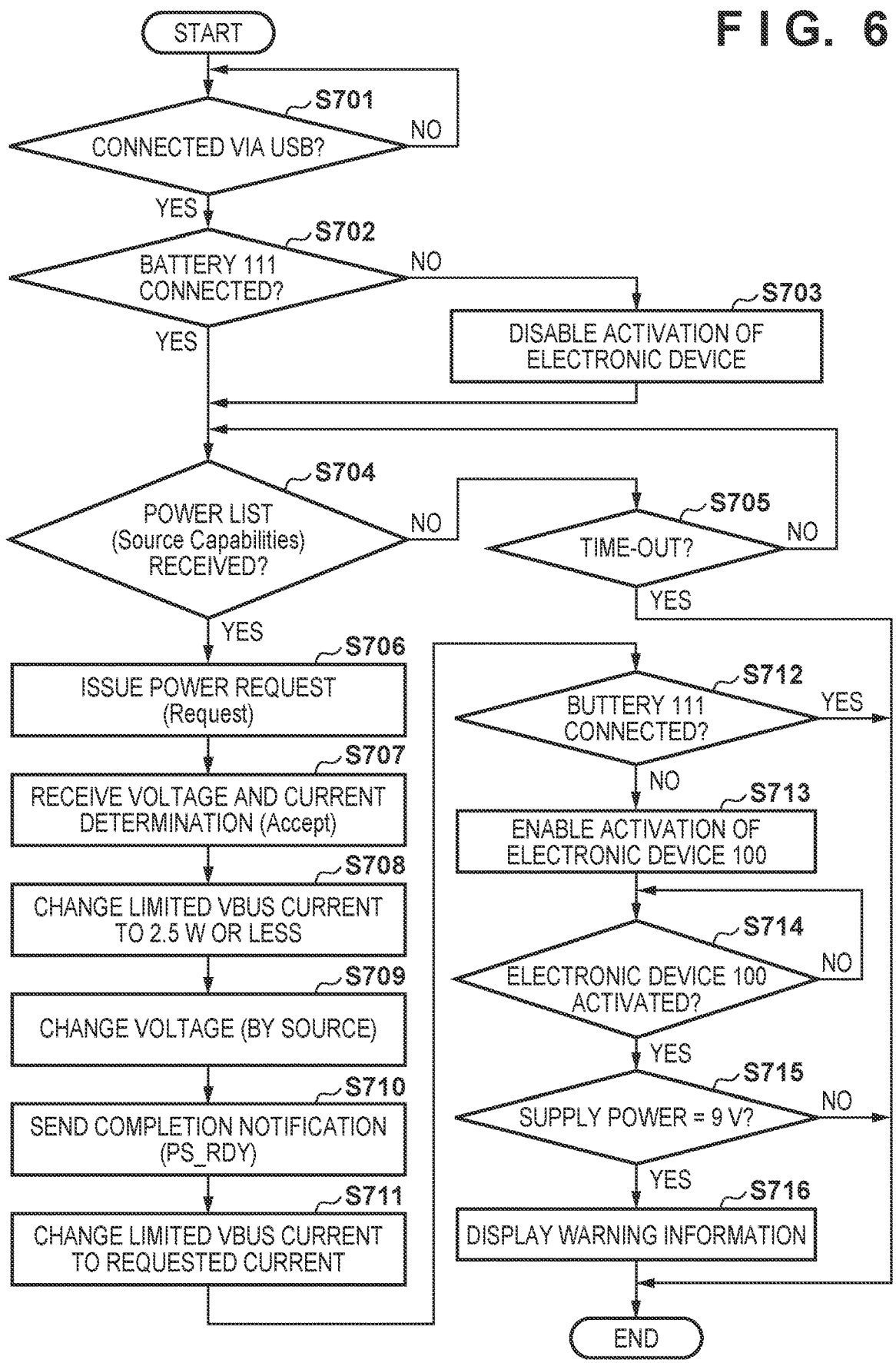
FIG. 6 is a flowchart illustrating processing performed by the electronic device 100 in the second embodiment.

Referring to the flowchart of FIG. 6, processing when the electronic device 100 is connected to the power supply apparatus 300 through the USB Type-C cable 200 will be described. The processing illustrated in FIG. 6 is performed by the sub control unit 108 controlling the components of the electronic device 100 according to a program. The processing illustrated in FIG. 6 is started after the power supply apparatus 300 is connected to the connection unit 110 of the electronic device 100.

FIG. 9 is a timing chart for illustrating the processing performed when the electronic device 100 that operates with VBUS power and the power of the battery 111 is connected to the power supply apparatus 300 through the USB Type-C cable 200.

FIG. 9 illustrates a communication signal from the connected device information acquisition unit 303 of the power supply apparatus 300 and a communication signal of the connected device information acquisition unit 1091 of the electronic device 100 from the top. The chart next illustrates a VBUS voltage output from the power control unit 305 of the power supply apparatus 300 to the connection unit 110 through the USB Type-C cable 200. The chart also illustrates a limited VBUS current limited by the power supply control unit 1093. The chart next illustrates whether the sub control unit 108 enables activation of the electronic device 100 based on an instruction on the operation unit 104, with the battery 111 inserted. The chart next illustrates whether the sub control unit 108 enables activation of the electronic device 100 based on an instruction on the operation unit 104, without the battery 111 inserted.

Referring next to FIGS. 6 and 9, the processing when the electronic device 100 is connected to the power supply apparatus 300 through the USB Type-C cable 200 will be described. In the second embodiment, the electronic device 100 is connected to the power supply apparatus 300 at a voltage of 5 V or 9 V. Instead, a voltage of 15 V or 20 V, or another voltage can be used.

In step S701, the electronic device 100 detects that the power supply apparatus 300 is connected to the connection unit 110. The signals and so on proceed to state T911 in FIG. 9, in which a VBUS voltage of 5.0 V is supplied. Whether connection has been established can be determined by detecting the VBUS voltage with the voltage monitoring unit 1096 or by determining the voltage level of the CC terminal with the connected device information acquisition unit 1091. The processing does not proceed to the subsequent step until connection of the power supply apparatus 300 to the connection unit 110 is detected.

When the power supply apparatus 300 is connected to the connection unit 110, step S702 is started. In step S702, the sub control unit 108 determines whether the battery 111 has been connected to the connection unit 1095. For determination, the voltage level of the battery 111 can be used, or whether a thermistor terminal or a battery authentication terminal is present can be used. Alternatively, a battery cover and a physical switch for detecting whether the battery cover has been opened can be provided to the connection unit 1095 to determine whether the battery 111 has been connected using the open/close state of the battery cover. The remaining amount of the battery 111 can be used as a criterion for determination instead of the presence or absence of the battery 111.

If in step S702 it is determined that the battery 111 is not present, the sub control unit 108 proceeds to step S703. In step S703, even if an activation button, which is one of the components of the operation unit 104, is pressed, the sub control unit 108 disables starting the main control unit 101 and the power control unit 112. As a result, the operation of the electronic device 100 is not started even if the user presses the activation button.

In step S704, the electronic device 100 waits for the reception of a power list (Source Capabilities) from the connected device information acquisition unit 303 to the connected device information acquisition unit 1091.

In step S705, the connected device information acquisition unit 1091 waits for the reception of the power list (Source Capabilities) until a time-out occurs. For example, if the electronic device 100 cannot receive the power list even after waiting for 620 ms, the electronic device 100 sends a reset signal to the connected device information acquisition unit 303 via the connected device information acquisition unit 1091. If the electronic device 100 cannot receive the power list (Source Capabilities) even after repeating the above operation three times, a time-out occurs. Upon the time-out, the process for connection is terminated. The setting of the sub control unit 108 can be changed to permit the activation of the main control unit 101 and the power control unit 112 when an activation button, which is one of the components of the operation unit 104, is pressed.

If in step S704 the connected device information acquisition unit 1091 receives the power list (Source Capabilities), step S706 is started. T912 in FIG. 9 illustrates this state. Since, in the second embodiment, the power control unit 305 can supply a voltage of 5 V or 9 V, two lists of 5 V/3 A and 9 V/3 A are presented. Any of 5 V, 9 V, 15 V, and 20 V is presented in the list depending on the capacity of the power supply apparatus 300.

In the second embodiment, the activation of the camera is disabled after determination of whether the battery 111 is connected when USB connection is detected. Alternatively, the activation of the camera can be disabled after determination of whether the battery 111 is connected when the power list is received.

In step S706, the connected device information acquisition unit 1091 issues a power request (Request) to the connected device information acquisition unit 303. T913 in FIG. 9 illustrates this state. In the second embodiment, the electronic device 100 can be activated at 5 V/3 A or 9 V/2 A and issues a request for 9 V/2 A. The electronic device 100 can request any other voltage values that are present in the power list received in step S704.

The power supply apparatus 300 sends the voltage and current determination (Accept) to the electronic device 100 if it can supply the necessary power based on the power necessary for the electronic device 100 (Request), received by the connected device information acquisition unit 303.

In step S707, the connected device information acquisition unit 1091 receives the voltage and current determination (Accept) from the connected device information acquisition unit 303. T914 in FIG. 9 illustrates this state.

In step S708, the sub control unit 108 that has received the voltage and current determination (Accept) sets a VBUS current limit for the power supply control unit 1093 within a predetermined time (15 ms) after receiving the voltage and current determination (Accept). T915 in FIG. 9 illustrates this state. The limited VBUS current in the second embodiment, which is assumed to be changed to 9 V, needs to be set to approximately 0.277 A or less to satisfy predetermined power (2.5 W) or less in the case of 9 V. In the second embodiment, the limited VBUS current is set to 0.1 A or less. Thus, the current value that is limited depending on the required voltage is determined to be less than or equal to "predetermined power (2.5 W)÷required voltage". This enables satisfying the restriction of the USB PD standard that, if the voltage supplied from the power supply apparatus 300 is not 5 V, the power to be received from the power supply apparatus 300 has to be brought to 2.5 W or less within 15 ms after receiving the voltage and current determination (Accept).

In step S709, the power supply apparatus 300 changes the output voltage VBUS from 5 V to 9 V by controlling the power control unit 305 based on an instruction from the control unit 301. T916 in FIG. 9 illustrates this state. After completion of the change to 9 V performed by the power control unit 305, the connected device information acquisition unit 303 sends a completion notification.

In step S710, the connected device information acquisition unit 1091 receives the completion notification (PS_RDY) from the connected device information acquisition unit 303. T917 in FIG. 9 illustrates this state.

In step S711, the sub control unit 108 that has received completion notification (PS_RDY) requests the power supply control unit 1093 to change the limited VBUS current to the current value of the power request (Request). In the second embodiment, the sub control unit 108 sends a request to change the limited VBUS current from 0.1 A to 2.0 A requested in the case of 9 V. T918 in FIG. 9 illustrates this state.

In step S712, the sub control unit 108 determines whether the battery 111 has been connected to the connection unit 1095. For determination, the voltage level of the battery 111 can be used, or whether a thermistor terminal or a battery authentication terminal is present can be used. Alternatively, a physical switch can be provided to determine whether the battery 111 has been connected using the open/close state of a battery cover. The remaining amount of the battery 111 can be used as a criterion for determination instead of the presence or absence of the battery 111. If it is determined that the battery 111 is not present, the sub control unit 108 proceeds to step S713.

In step S713, the sub control unit 108 changes the setting to enable activation of the main control unit 101 and the power control unit 112 when an activation button, which is one of the components of the operation unit 104, is pressed. This enables the user to start the operation of the electronic device 100 when the user presses the activation button. T919 in FIG. 9 illustrates this state.

When the activation button, which is one of the components of the operation unit 104, is pressed so that the main control unit 101 and the power control unit 112 are activated (step S714), it is determined whether the supplied power is 9 V (step S715). Methods for the determination include detecting a VBUS voltage with the voltage monitoring unit 1096 and obtaining VBUS voltage information from the content of communication of the connected device information acquisition unit 1091 with the power supply apparatus 300. In this case, if the electronic device 100 is operating at 9 V, warning information, as illustrated in FIG. 7, is displayed on the display unit 105 (step S716). This is because, if the voltage has to be decreased to 5 V or the like due to some requirements on the power supply apparatus 300 side, the electronic device 100 can lose the power supply to cause interruption of supply power in the electronic device 100. For example, warning information, "power supply can be decreased owing to supplier's circumstances, and the device can be shut down", as illustrated in FIG. 7, is displayed on the display unit 105.

In the second embodiment, the warning information is displayed on the display unit 105 only when the electronic device 100 is connected at 9 V, the warning information as illustrated in FIG. 7 can also be displayed on the display unit 105 when the electronic device 100 requests a voltage higher than 5 V and is connected at the voltage. While, in the second embodiment, the warning information as illustrated in FIG. 7 is displayed on the display unit 105, the warning information as illustrated in FIG. 7 can be output with a speaker or the like.

When the electronic device 100 is connected at 5 V, no voltage change occurs unless the power request (Request) is given by the connected device information acquisition unit 1091 even if the power list is updated to a voltage higher than 5 V, producing no problem. For that reason, if the connection in step S715 is at 5 V, the processing ends.

Third Embodiment

Various functions, processes, or methods according to the first and second embodiments can be implemented by a personal computer, a microcomputer, a CPU, or a microprocessor using a program. In a third embodiment, a personal computer, a microcomputer, a CPU, or a microprocessor is collectively referred to as a "computer X". In the third embodiment, a program for controlling the computer X and implementing various functions, processes, or methods according to the first and second embodiments is referred to as a "program Y".

Various functions, processes, or methods according to the first and second embodiments are implemented when the computer X executes the program Y. In this case, the program Y is supplied to the computer X via a computer-readable storage medium. The computer-readable storage medium according to the third embodiment includes at least one of a hard disk drive, a magnetic storage device, an optical storage device, a magneto-optical storage device, a memory card, a volatile memory, or a nonvolatile memory. The computer-readable storage medium according to the third embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

This application claims the benefit of Japanese Patent Application No. 2019-141730, filed Jul. 31, 2019, which is hereby incorporated by reference herein in its entirety.

What is claimed is:

1. An electronic device comprising:
   a connector;
   an operation member operable by a user;
   a CPU; and
   a memory storing a program which, when executed by the CPU, causes the electronic device to function as:
   a receiving unit that receives an operation of the operation member for turning on the electronic device by a user;
   a power receiving unit that receives power from a power supply apparatus connected to the connector via a first terminal;
   a communication control unit that communicates with the power supply apparatus connected to the connector via a second terminal to receive power supply capability information of the power supply apparatus; and
   a control unit that turns on the electronic device in accordance with the operation of the operation member for turning on the electronic device by the user,
   where the control unit performs control such that after the power supply apparatus is connected to the connector and before a predetermined notification is received from the power supply apparatus, the electronic device is not turned on even if the operation member is operated for turning on the electronic device by the user, and
   wherein the predetermined notification is transmitted from the power supply apparatus to the electronic device when voltage supplied from the power supply apparatus is changed from 5 V to a voltage higher than 5 V.

2. The electronic device according to claim 1, wherein the control unit enables the electronic device to turn on by the operation of the operation member for turning on the electronic device by the user after the communication control unit receives the predetermined notification from the power supply apparatus.

3. The electronic device according to claim 1, wherein the control unit disables the electronic device to turn on by the operation of the operation member for turning on the electronic device by the user after the control unit determines that the power supply apparatus is connected to the connector.

4. The electronic device according to claim 3, wherein the connector is connected to the power supply apparatus according to Universal Serial Bus (USB) Type-C standard and the first terminal is a VBUS terminal, and the control unit determines that the power supply apparatus is connected to the connector by detecting that voltage is supplied to the VBUS terminal.

5. The electronic device according to claim 3, wherein the connector is connected to the power supply apparatus according to Universal Serial Bus (USB) Type-C standard and the second terminal is a Configuration Channel (CC) terminal, and the control unit determines that the power supply apparatus is connected to the connector by detecting that voltage is supplied to the CC terminal.

6. The electronic device according to claim 3, wherein the power receiving unit receives power from the power supply apparatus according to Universal Serial Bus (USB) Power Delivery (PD) standard and the second terminal is a Configuration Channel (CC) terminal, and the control unit determines that the power supply apparatus is connected to the connection unit by detecting receipt of the power supply capability information corresponding to the USB PD standard from the power supply apparatus.

7. The electronic device according to claim 1, wherein the control unit disables the electronic device to turn on by the operation of the operation member for turning on the electronic device by the user after the power supply apparatus is connected to the connector when no battery is connected to the electronic device and before the predetermined notification is received from the power supply apparatus when no battery is connected to the electronic device.

8. The electronic device according to claim 1, wherein an the control unit displays information indicating that instantaneous interruption of power supply can occur on a display in a case where voltage supplied from the power supply apparatus is higher than 5 V.

9. A control method of an electronic device comprising:
   receiving an operation of an operation member for turning on the electronic device by a user;
   receiving power from a power supply apparatus connected to a connector of the electronic device via a first terminal of the connector;
   communicating with the power supply apparatus connected to the connector via a second terminal of the connector to receive power supply capability information of the power supply apparatus;
   turning on the electronic device in accordance with the operation of the operation member for turning on the electronic device by the user; and
   performing control such that, after the power supply apparatus is connected to the connector and before a predetermined notification is received from the power supply apparatus, the electronic device is not turned on even if the operation member is operated for turning on the electronic device by the user,
   wherein the predetermined notification is transmitted from the power supply apparatus to the electronic device when voltage supplied from the power supply apparatus is changed from 5 V to a voltage higher than 5 V.

10. A non-transitory storage medium that stores a program causing a computer to execute a method, the method comprising:
   receiving an operation of an operation member for turning on an electronic device by a user;
   receiving power from a power supply apparatus connected to a connector of the electronic device via a first terminal of the connector;
   communicating with the power supply apparatus connected to the connector via a second terminal of the connector to receive power supply capability information of the power supply apparatus;
   turning activating the electronic device in accordance with the operation of the operation member for turning on the electronic device by the user; and
   performing control such that, after the power supply apparatus is connected to the connector and before a predetermined notification is received from the power supply apparatus, the electronic device is not turned on even if the operation member is operated for turning on the electronic device by the user,
   wherein the predetermined notification is transmitted from the power supply apparatus to the electronic device when voltage supplied from the power supply apparatus is changed from 5 V to a voltage higher than 5 V.

11. The method according to claim 9, further comprising: enabling the electronic device to turn on by the operation of the operation member for turning on the electronic device by the user after the predetermined notification is received from the power supply apparatus.

12. The method according to claim 9, wherein the performing the control disables the electronic device to turn on by the operation of the operation member for turning on the electronic device by the user after a control unit of the electronic device determines that the power supply apparatus is connected to the connector.

13. The method according to claim 12, wherein the connector is connected to the power supply apparatus according to Universal Serial Bus (USB) Type-C standard and the first terminal is a VBUS terminal, and a connection of the power supply apparatus is determined by detecting that voltage is supplied to the VBUS terminal.

14. The method according to claim 12, wherein the connector is connected to the power supply apparatus according to Universal Serial Bus (USB) Type-C standard and the second terminal is a Configuration Channel (CC) terminal, and a connection of the power supply apparatus is determined by detecting that voltage is supplied to the CC terminal.

15. The method according to claim 12, wherein the connector is connected to the power supply apparatus according to Universal Serial Bus (USB) Power Delivery (PD) standard and the second terminal is a Configuration Channel (CC) terminal, and a connection of the power supply apparatus is determined by detecting receipt of the power supply capability information corresponding to the USB PD standard from the power supply apparatus.

16. The method according to claim 9, wherein the performing the control disables the electronic device to turn on by the operation of the operation member for turning on the electronic device by the user after the power supply apparatus is connected to the connector when no battery is connected to the electronic device and before the predetermined notification is received from the power supply apparatus when no battery is connected to the electronic device.

17. The method according to claim 9, further comprising: displaying information indicating that instantaneous interruption of power supply can occur on a display in a case where voltage supplied from the power supply apparatus is higher than 5 V.

18. The electronic device according to claim 1, wherein the power receiving unit receives power from the power supply apparatus according to Universal Serial Bus (USB) Power Delivery (PD) standard,
wherein the control unit controls the communication control unit to request the voltage higher than 5 V to the power supply apparatus in accordance with the power supply capability information received from the power supply apparatus, and
wherein the voltage supplied from the power supply apparatus is changed from the 5 V to the voltage higher than 5 V in accordance with the request.

* * * * *